(12) United States Patent
Ogasawara

(10) Patent No.: US 10,353,329 B2
(45) Date of Patent: Jul. 16, 2019

(54) CAM HAVING MULTIPLE CONTACT STATES FOR AN APPARATUS

(71) Applicant: Brother Kogyo Kabushiki Kaisha, Nagoya-shi, Aichi-ken (JP)

(72) Inventor: Tatsuo Ogasawara, Nagoya (JP)

(73) Assignee: Brother Kogyo Kabushiki Kaisha, Nagoya-shi, Aichi-ken (JP)

(*) Notice: Subject to any disclaimer, the term of this patent is extended or adjusted under 35 U.S.C. 154(b) by 0 days.

(21) Appl. No.: 15/855,014

(22) Filed: Dec. 27, 2017

(65) Prior Publication Data

US 2018/0196383 A1 Jul. 12, 2018

(30) Foreign Application Priority Data

Dec. 27, 2016 (JP) .................. 2016-253005

(51) Int. Cl.
*G03G 15/00* (2006.01)
*G03G 15/20* (2006.01)
*F16H 25/18* (2006.01)
*F16H 37/12* (2006.01)

(52) U.S. Cl.
CPC ........... *G03G 15/206* (2013.01); *F16H 25/18* (2013.01); *F16H 37/12* (2013.01)

(58) Field of Classification Search
CPC ........... G03G 21/1647; G03G 21/1676; G03G 15/0865; G03G 15/0896; G03G 2221/1657
See application file for complete search history.

(56) References Cited

U.S. PATENT DOCUMENTS

| 5,926,680 A * | 7/1999 | Yamamoto ......... G03G 15/2053 399/328 |
| 9,182,715 B1 | 11/2015 | Ueno et al. |
| 2003/0108359 A1* | 6/2003 | Chung ................. G03G 15/234 399/124 |
| 2014/0064763 A1 | 3/2014 | Watanabe |

FOREIGN PATENT DOCUMENTS

| EP | 2505796 A2 | 10/2012 |
| JP | 2012-202355 A | 10/2012 |
| JP | 2014-52458 A | 3/2014 |
| JP | 2014-63003 A | 4/2014 |
| JP | 2016-70981 A | 5/2016 |
| JP | 2017-116567 A | 6/2017 |

* cited by examiner

*Primary Examiner* — Walter L Lindsay, Jr.
*Assistant Examiner* — Jessica L Eley
(74) *Attorney, Agent, or Firm* — Banner & Witcoff, Ltd.

(57) ABSTRACT

A fixing device includes a frame including a joint, a first rotary body and supported at the frame, a second rotary body, a spring with one end connected to the frame, a support arm connected to the joint, the second rotary body, and another end of the spring, a cam pivotably connected to one of the frame and the support arm, and a receiving member. The cam includes a first cam portion, and a second cam portion located at a different point from the first cam portion in the axial direction and having a radial distance from the pivot axis smaller than a radial distance of the first cam portion from the pivot axis. The receiving member includes a first receiving surface and a second receiving surface, the second receiving surface having a different surface height than the first receiving surface in a radial direction from the pivot axis.

20 Claims, 11 Drawing Sheets

CAM HAVING MULTIPLE CONTACT STATES FOR AN APPARATUS

CROSS-REFERENCE TO RELATED APPLICATION

This application claims priority from Japanese Patent Application No. 2016-253005 filed on Dec. 27, 2016, the contents of which are incorporated herein by reference in its entirety.

FIELD OF DISCLOSURE

Aspects of the disclosure relate to a fixing device configured to vary pressure at a nip between rotatable members, and to an image forming apparatus including the fixing device.

BACKGROUND

A known fixing device, for example, as disclosed in Japanese Laid-Open Patent Publication No. 2014-063003, includes a mechanism that varies pressure at a nip between a heat roller and a pressure roller, with a cam rotated by an operating lever. The cam is attached to a pressure arm that supports the pressure roller. More specifically, a surface of the cam contacts a support surface of a frame member that rotatably supports the heat roller. Rotation of the cam changes the position of the pressure arm, thereby varying the pressure at the nip. The surface of the cam and the support surface of the frame member are each non-stepped or flat in an axial direction of the cam.

SUMMARY

Aspects described herein provide systems and apparatuses that allow for varying of the pressure at the nip between rotatable members. Additionally, the systems and apparatuses provide a cam with multiple contact states, allowing a nip pressure to be varied at additional positions and/or with greater ease than those of the related art.

According to one or more aspects of the disclosure, a fixing device is provided. The fixing device may include a frame, a first rotary body, a second rotary body, a spring, a support arm, and a receiving member. The frame may include a joint. The first rotary body may extend in an axial direction and be supported at the frame. The second rotary body may extend in the axial direction. The spring may include one end connected to the frame. The support arm may be connected to the joint, the second rotary body, and another end of the spring. The cam may be pivotably connected to one of the frame and the support arm. The cam may be pivotable about a pivot axis extending parallel to the axial direction. The cam may include a first cam portion, and a second cam portion located at a different point from the first cam portion in the axial direction and having a radial distance from the pivot axis smaller than a radial distance of the first cam portion from the pivot axis. The receiving member may be disposed on the other of the frame and the support arm that is not pivotably connected to the cam. The receiving member may include a first receiving surface and a second receiving surface. The second receiving surface may have a different surface height than the first receiving surface in a radial direction from the pivot axis. The fixing device may be configured such that when the first cam portion is in contact with the first receiving surface, the second cam portion is out of contact with the second receiving surface and, when the first cam portion is out of contact with the first receiving surface, the second cam portion is in contact with the second receiving surface.

One or more aspects of the disclosure provide an image forming apparatus including a process unit configured to form a developer image on a sheet, and a fixing device configured to fix, onto the sheet, the developer image formed by the process unit.

DETAILED DESCRIPTION

Figure 1:
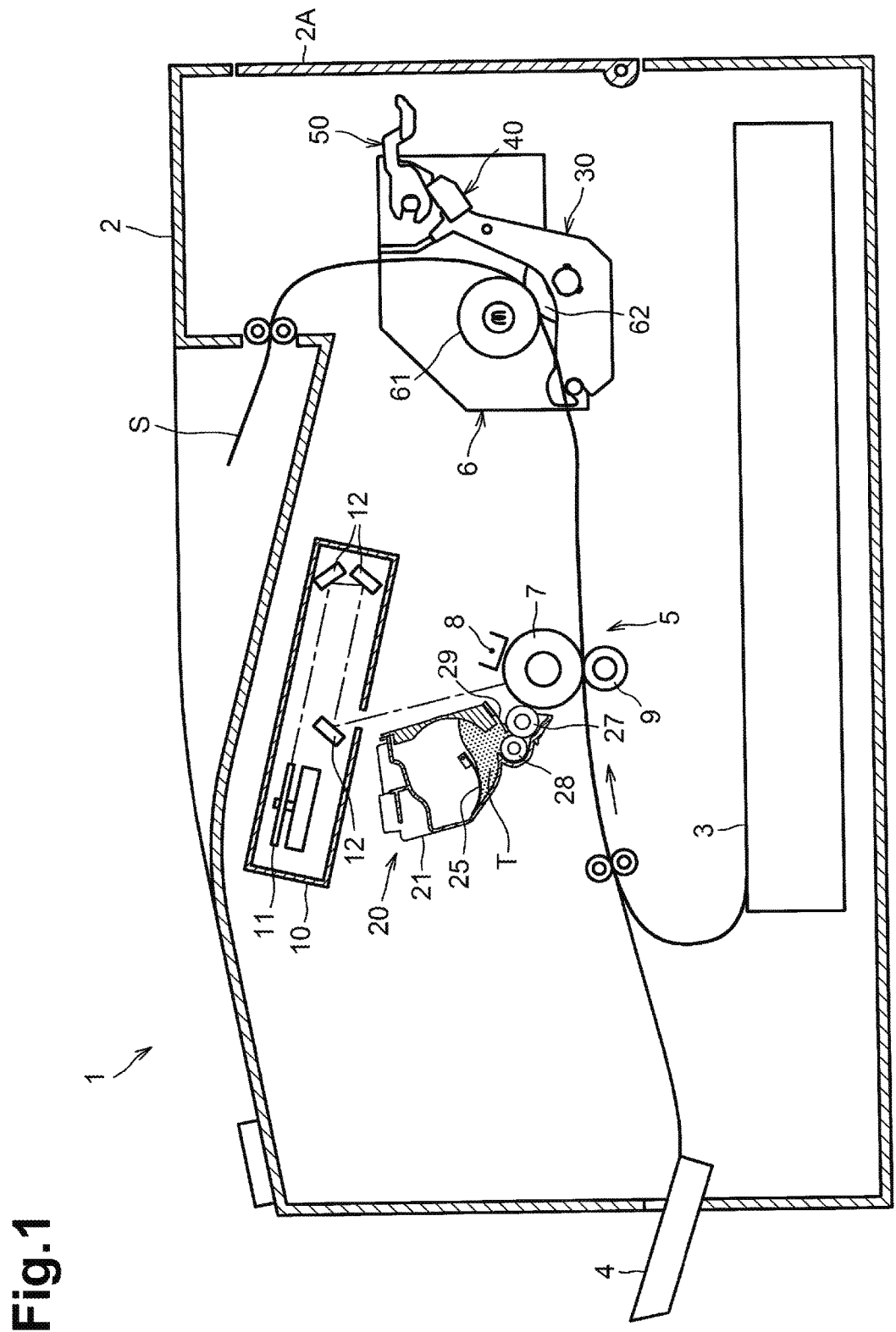
FIG. 1 is a cross-sectional view of an image forming apparatus in an illustrative embodiment according to one or more aspects of the disclosure.

An image forming apparatus in an illustrative embodiment according to one or more aspects of the disclosure is may include a laser printer 1, as an example of the image forming apparatus, and as shown in FIG. 1. Laser printer 1 is configured to form an image on a sheet S. The laser printer 1 includes a casing 2, a feed tray 3, a manual feed tray 4, a process unit 5, and a fixing device 6. The casing 2 includes a rear cover 2A configured to pivotally move about its lower end, so that the rear cover 2A may be opened or closed. Opening the rear cover 2A provides an access to the fixing device 6 from the rear side of the laser printer 1.

The process unit 5 is configured to form a developer image on a sheet S. The process unit 5 includes a photosensitive member, e.g., a photosensitive drum 7, a charger 8, a transfer roller 9, a scanner 10, and a developer cartridge 20.

The scanner 10 is located at an upper portion of the printer 1 inside the casing 2. The scanner 10 includes a laser emitter (not depicted), a polygon mirror 11, a plurality of reflecting mirrors 12, and a plurality of lenses (not depicted). The scanner 10 emits laser light from the laser emitter to the photosensitive drum 7, via the polygon mirror 11, the reflecting mirrors 12, and the lenses, as indicated by alternate long and short dashed lines in FIG. 1, to scan across the surface of the photosensitive drum 7.

The developer cartridge 20 includes a casing 21 configured to store developer, e.g., toner T, an agitator 25 configured to agitate the toner T in the casing 21, a developer roller 27, a supply roller 28 configured to supply the toner T to the developer roller 27, and a blade 29. The casing 21 rotatably supports the agitator 25, the developer roller 27, and the supply roller 28.

The developer roller 27 is disposed facing the photosensitive drum 7. The rotating supply roller 28 supplies the toner T in the casing 21 to the developer roller 27. The developer roller 27 supplies the toner T to the photosensitive drum 7.

The photosensitive drum 7 is configured to rotate counterclockwise in FIG. 1. The charger 8 is disposed at least partially above the photosensitive drum 7. The charger 8 may be, but not limited to, a scorotron charger. The transfer roller 9 is disposed below the photosensitive drum 7, facing the photosensitive drum 7.

The photosensitive drum 7 is positively charged by the charger 8 while rotating. The photosensitive drum 7 is exposed to the laser light from the scanner 10, thereby having an electrostatic latent image formed on a surface of the photosensitive drum 7. Subsequently, the developer roller 27 supplies the toner T to the electrostatic latent image on the photosensitive drum 7 to develop the electrostatic latent image into a developer image. The developer image on the photosensitive drum 7 is transferred to the sheet S with a transfer bias applied to the transfer roller 9 as the sheet S passes between the photosensitive drum 7 and the transfer roller 9.

The fixing device 6 is disposed downstream of the photosensitive drum 7 in a conveying direction of the sheet S. The fixing device 6 includes a heat roller 61 and a pressure roller 62 configured to be pressed against the heat roller 61. A nip is formed between the heat roller 61 and the pressure roller 62 when the pressure roller 62 is pressed against the heat roller 61. The heat roller 61 and the pressure roller 62 convey the sheet S while holding the sheet S therebetween. The heat roller 61 has a cylinder portion and a heater disposed inside the cylinder portion. The fixing device 6 is configured to thermally fix the developer image on the sheet S with the application of heat, while the sheet S passes through the nip between the heat roller 61 and the pressure roller 62. The heat roller 61 is an example of a first rotary body, and the pressure roller 62 is an example of a second rotary body.

Figure 2A:
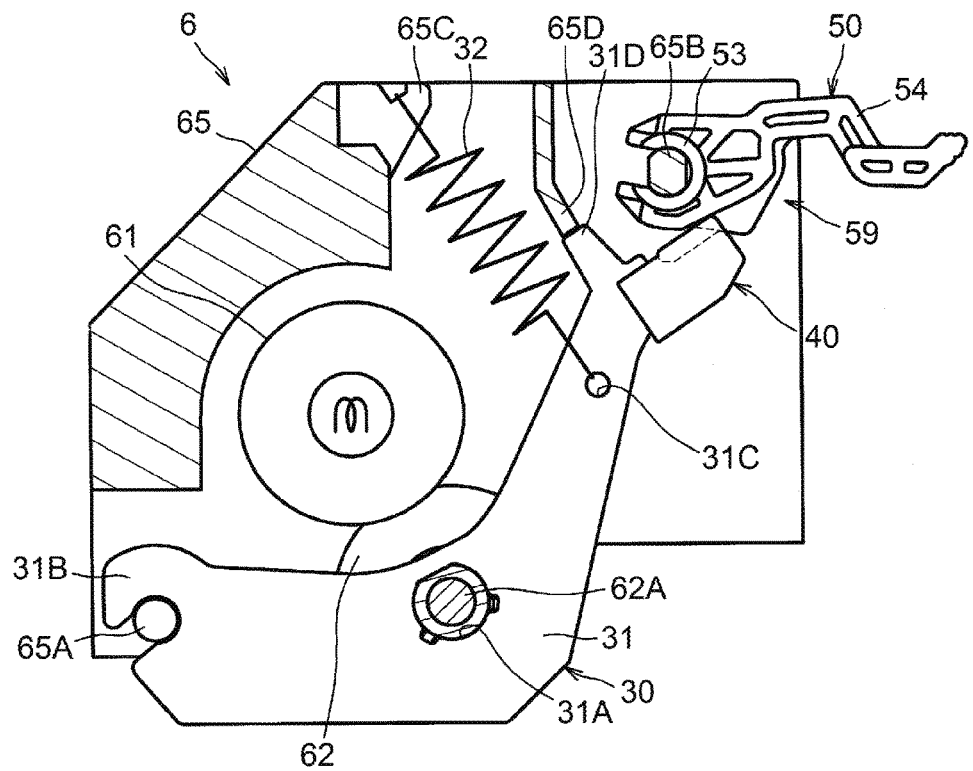
FIG. 2A is a side view of a nip pressure varying mechanism according to one or more aspects of the disclosure, when a biasing member is at a first position.

As depicted in FIG. 2A, the fixing device 6 includes a frame 65, a biasing member 30, and an operating lever 50. The frame 65 supports the heat roller 61 and the biasing member 30. The biasing member 30 may be configured to bias one of the pressure roller 62 and the heat roller 61 toward the other. In the illustrative embodiment, the biasing member 30 is configured to bias the pressure roller 62 toward the heat roller 61. The biasing member 30 includes a support arm 31, a cover 40, and a spring 32.

The support arm 31 includes a shaft supporting portion 31A, a fulcrum portion 31B, and a spring engagement portion 31C. The shaft supporting portion 31A may include a hole disposed at a middle portion of the support arm 31. The shaft supporting portion 31A is connected to a shaft 62A of the pressure roller 62 such that the shaft 62A is rotatable. The shaft supporting portion 31A is an example of a second connected portion. The fulcrum portion 31B may include a U-shaped cutout disposed at a first end of the support arm 31. The fulcrum portion 31B is connected to a protrusion 65A provided at the frame 65 such that the protrusion 65A is pivotable. This configuration allows the support arm 31 to pivot about the protrusion 65A. The fulcrum portion 31B is an example of a second connected portion and the protrusion 65A is an example of a joint. The spring engagement portion 31C may include a hole disposed at a portion of the support arm 31 opposite to the fulcrum portion 31B, with respect to the shaft supporting portion 31A. The spring engagement portion 31C is an example of a third connected portion.

The cover 40 is attached to a second end of the support arm 31 opposite to the first end. As will be described in detail, the cover 40 contacts to the cam 59. The cover 40 is an example of a receiving member.

The spring 32 is, for example, a tension coil spring. The spring 32 is connected to the spring engagement portion 31C at one end, and a cutout 65C of the frame 65 at the other end. The spring 32 exerts a force on the biasing member 30, so that the support arm 31 may be biased substantially upward in FIG. 2A (e.g., in a direction from the pressure roller 62 toward the heat roller 61).

The support arm 31 includes a restricting member 31D disposed between the spring engagement portion 31C and the second end. The restricting member 31D protrudes from the support arm 31 toward the cutout 65C (e.g., in a direction from the spring engagement portion 31C to toward the cutout 65C). The frame 65 includes a stopper 65D configured to contact the restricting member 31D. When the restricting member 31D contacts the stopper 65D, the support arm 31 may not be moving upward although the support arm 31 is biased upward by the spring 32 as shown in FIG. 2A.

The operating lever 50 includes a lever arm 54 and a cam 59. The lever arm 54 and the cam 59 are integrally formed into a single piece. The cam 59 includes a bearing portion 53 having a U-shaped cutout. The lever arm 54 extends from the cam 59. The lever arm 54 is configured to be operated by a user. The operating lever 50 is supported by the frame 65 such that the bearing portion 53 is connected to a projection 65B of the frame 65. This allows the operating lever 50 to pivot relative to the frame 65.

The cam 59 is configured to pivot in contact or engagement with the cover 40 of the biasing member 30. Pivoting the cam 59 causes the biasing member 30 to pivot against the force of the spring 32.

Figure 3A:
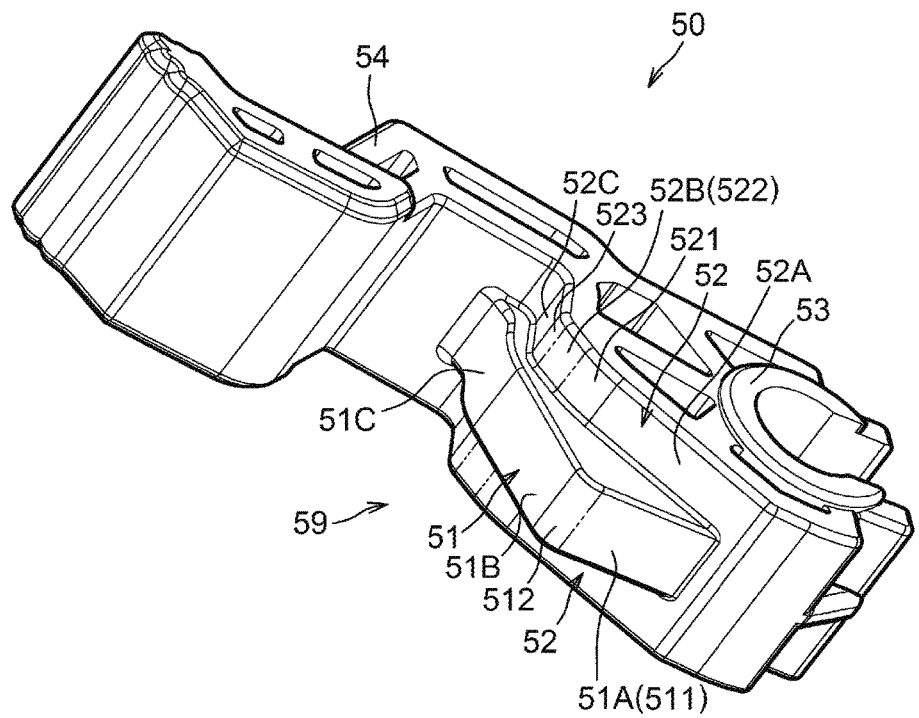
FIG. 3A is a perspective view of a cam according to one or more aspects of the disclosure.
Figure 3B:
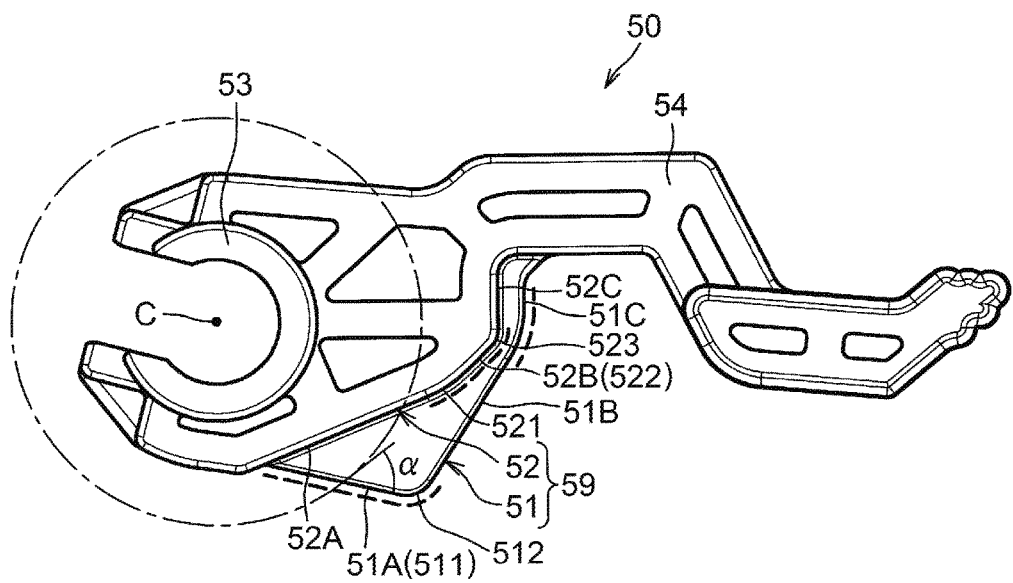
FIG. 3B is a side view of the cam of FIG. 3A viewed in an axial direction thereof.

As depicted in FIGS. 3A and 3B, the cam 59 includes a first cam portion 51 and a second cam portion 52. The first cam portion 51 is located at a middle of the cam 59 in an axial direction of the cam 59. The second cam portion 52 is different from the first cam portion 51 and is located on both sides of the first cam portion 51 in the axial direction.

Figure 4A:
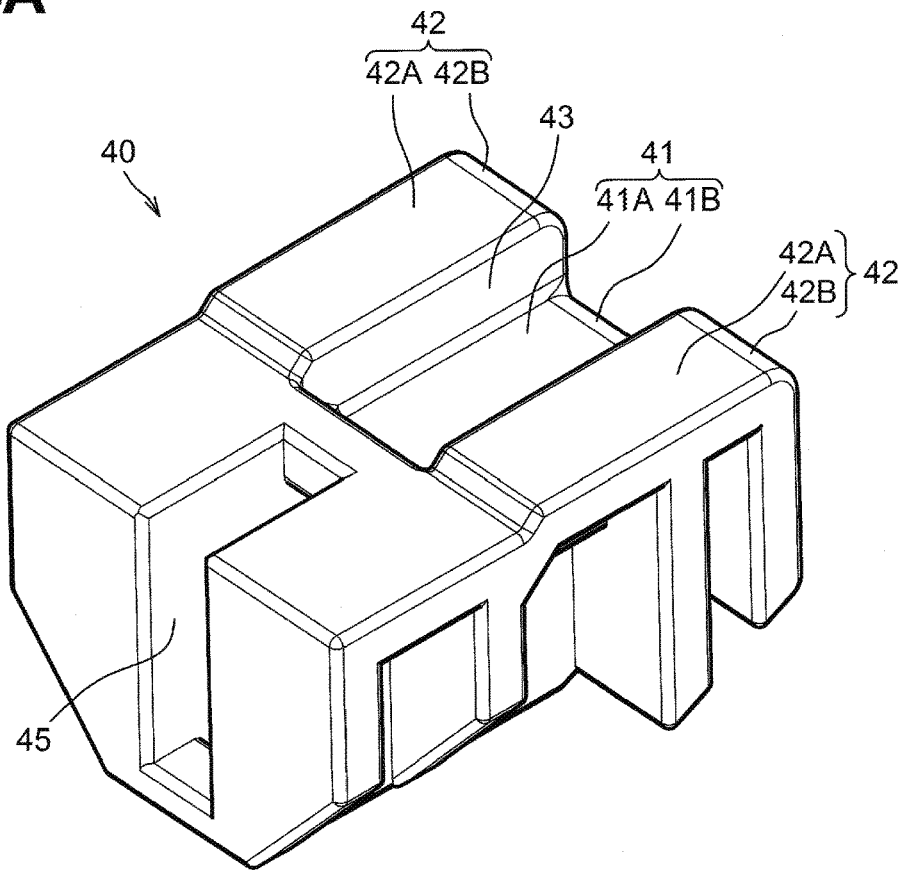
FIG. 4A is a perspective view of a receiving member according to one or more aspects of the disclosure.
Figure 4B:
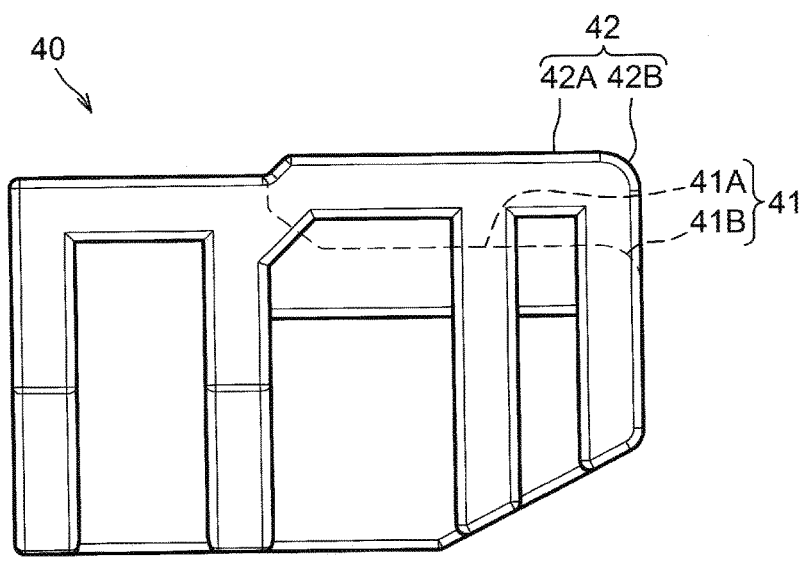
FIG. 4B is a side view of the receiving member of FIG. 4A.

As depicted in FIGS. 4A and 4B, the cover 40 includes a first receiving surface 41, second receiving surfaces 42, and an engagement portion 45. The first receiving surface 41 is located at a portion of the cover 40 that corresponds to the first cam portion 51 in the axial direction. The second receiving surfaces 42 are located at other portions of the cover 40 and correspond to the second cam portion 52 in the axial direction. The engagement portion 45 is grooved to receive an end (e.g., the second end) of the support arm 31. With the cover 40 attached to the support arm 30, the engagement portion 45 is located between the first upstream surface 41 and the spring engagement portion 31C.

The first receiving surface 41 includes a first flat surface 41A, and a first convex surface 41B. The first convex surface 41B is a curved surface extending continuously from one end of the first flat surface 41A. The first convex surface 41B defines a portion of an edge of the cover 40.

Each of the second receiving surfaces 42 includes a second flat surface 42A, and a second convex surface 42B. The second convex surface 42B is a curved surface extending continuously from one end of the second flat surface 42A. The second convex surface 42B defines a portion of an edge of the cover 40. One of the second receiving surfaces 42 is located on one side of the first receiving surface 41 in the axial direction, and the other of the second receiving surfaces 42 is located on the other side of the first receiving surface 41 in the axial direction. Each of the second receiving surfaces 42 are connected to the first receiving surface 41 by a respective one of side surfaces 43 that cross the axial direction. The first receiving surface 41 is not at the same level as the second receiving surface 42 when viewed in the axial direction. The first receiving surface 41 and the two side surfaces 43 define a recess in which the first cam portion 51 engages.

As depicted in FIGS. 3A and 3B, a periphery of the first cam portion 51 has a first downstream surface 51A, a first intermediate surface 51B, and a first upstream surface 51C. The periphery of the first cam portion 51 is located farther from a pivot axis C of the cam 59 than the second cam portion 52 in a radial direction of the cam 59 (hereinafter, simply referred to as "the radial direction"). In short, the first cam portion 51 has a greater radial extension from pivot axis C than the second cam portion 52.

The first downstream surface 51A, when viewed from a side, is indicated in FIG. 3B by broken lines drawn close to a reference numeral 51A. One portion of the first downstream surface 51A is located further downstream in a counterclockwise direction in FIG. 3B than another portion of the first downstream surface 51A. A distance between the one portion of the first downstream surface 51A and the pivot axis C of the cam 59 is greater than a distance between the another portion of the first downstream surface 51A and the pivot axis C of the cam 59.

The first downstream surface 51A includes a flat surface 511 and a curved surface 512 (refer to FIG. 3A). The curved surface 512 is located farther from the pivot axis C than the flat surface 511. The flat surface 511 of the first downstream surface 51A has a prescribed inclination angle α. In this disclosure, an inclination angle α of a peripheral surface of the cam 59 is defined as an angle formed between the peripheral surface of the cam 59 and a line tangential to a circumference of an imaginary circle, which is centered on the pivot axis C, at a point on the peripheral surface of the cam 59. In the following description, a direction in which the operating lever 50 pivots to cause the biasing member 30 to pivot in a particular direction, e.g., the clockwise direction in FIG. 3B, may be referred to as a "first pivot direction". The first pivot direction is an example of a first rotational direction of the pivot axis.

The first intermediate surface 51B of the first cam portion 51 is located upstream of the first downstream surface 51A of the first cam portion 51 in the first pivot direction. The first intermediate surface 51B is a flat surface extending continuously from the first downstream surface 51A. The first intermediate surface 51B has an inclination angle α smaller than the inclination angle α of the first downstream surface 51A. The inclination angle α of a certain portion of the first intermediate surface 51B may be zero.

The first upstream surface 51C of the first cam portion 51 is located upstream of the first intermediate surface 51B of the first cam portion 51 in the first pivot direction. The first upstream surface 51C extends continuously from the first intermediate surface 51B. The first upstream surface 51C, when viewed from a side, is indicated in FIG. 3B by broken lines drawn close to a reference numeral 51C. The first upstream surface 51C includes a curved surface extending continuously from the first intermediate surface 51B, and a flat surface extending continuously from the curved surface. The first upstream surface 51C is out of contact with the first receiving surface 41 of the cover 40. The first upstream surface 51C does not have a function to pivot the biasing member 30, but has a function to bring the cam 59 into engagement with the cover 40 while being sandwiched between the two side surfaces 43. The movement of the first upstream surface 51C will be described below.

A peripheral surface of the second cam portion 52 includes a second downstream surface 52A, a second intermediate surface 52B, and a second upstream surface 52C.

The second downstream surface 52A crosses an imaginary plane (e.g., an imaginary plane P2 in FIG. 5B) that includes the pivot axis C and passes through the first downstream surface 51A. The second downstream surface 52A is out of contact with the second receiving surfaces 42. The second downstream surface 52A does not have a function to pivot the biasing member 30.

The second intermediate surface 52B of the second cam portion 52 is located upstream of the second downstream surface 52A of the second cam portion 52 in the first pivot direction. The second intermediate surface 52B extends continuously from the second downstream surface 52A. The second intermediate surface 52B, when viewed from a side, is indicated in FIG. 3B by broken lines drawn close to a reference numeral 52B. One portion of the second intermediate surface 52B is located further downstream in the counterclockwise direction in FIG. 3B than another portion of the second intermediate surface 52B. A distance between the one portion of the second intermediate surface 52B and the pivot axis C of the cam 59 is greater than a distance between the another portion of the second intermediate surface 52B and the pivot axis C of the cam 59.

As depicted in FIG. 3A, the second intermediate surface 52B has a first curved surface 521, a flat surface 522, and a second curved surface 523. The flat surface 522 is located upstream of the first curved surface 521 in the first pivot direction and extends continuously from the first curved surface 521. The second curved surface 523 is located upstream of the flat surface 522 in the first pivot direction and extends continuously from the flat surface 522. The flat surface 522 of the second intermediate surface 52B has an inclination angle α smaller than the inclination angle α of the flat surface 511 of the first upstream surface 51A and greater than the inclination angle α of the first intermediate surface 51B.

The second upstream surface 52C of the second cam portion 52 is located upstream of the second intermediate surface 52B of the second cam portion 52 in the first pivot direction. The second upstream surface 52C is a flat surface extending continuously from the second intermediate surface 52B. The second upstream surface 52C has an inclination angles α smaller than the inclination angle α of the flat surface 522 of the second intermediate surface 52B. The inclination angle of a certain portion of the second upstream surface 52C may be including zero.

Figure 6A:
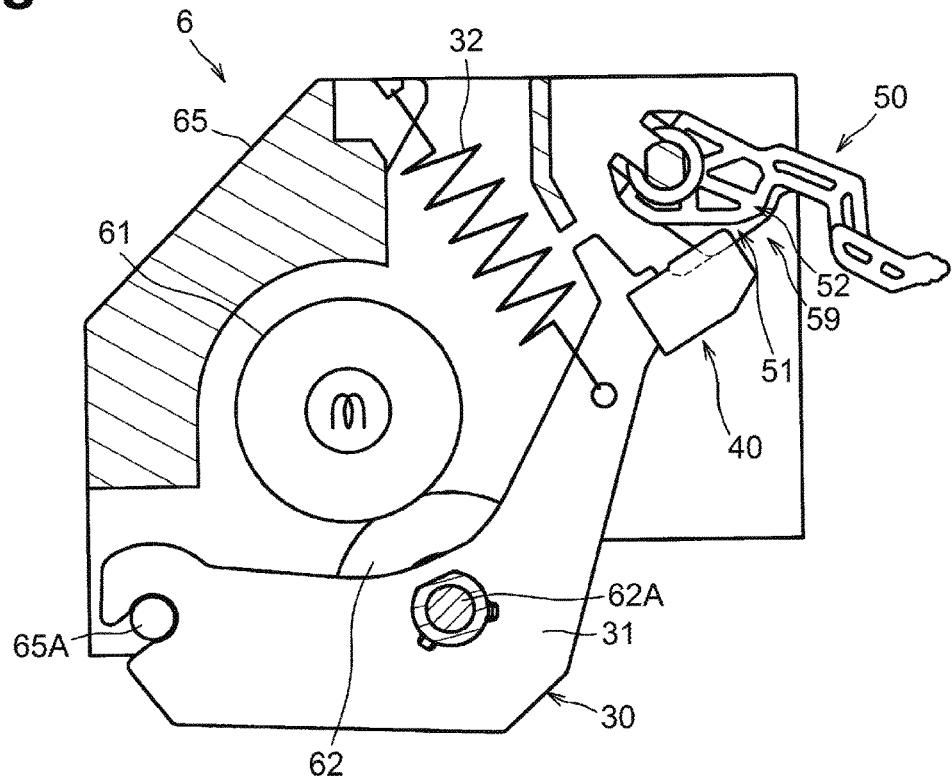
FIG. 6A is a side view of a nip pressure adjusting mechanism, according to one or more aspects of the disclosure, when the biasing member is at a second position.
Figure 7A:
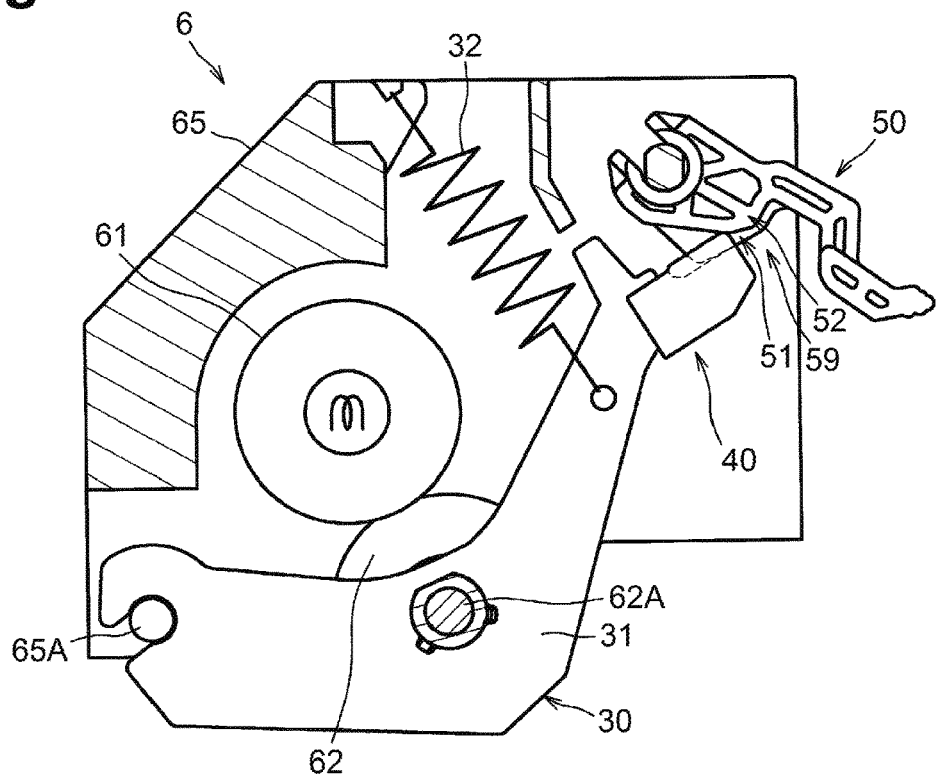
FIG. 7A is a side view of a nip pressure adjusting mechanism, according to one or more aspects of the disclosure, when the biasing member is at an intermediate position.
Figure 9A:
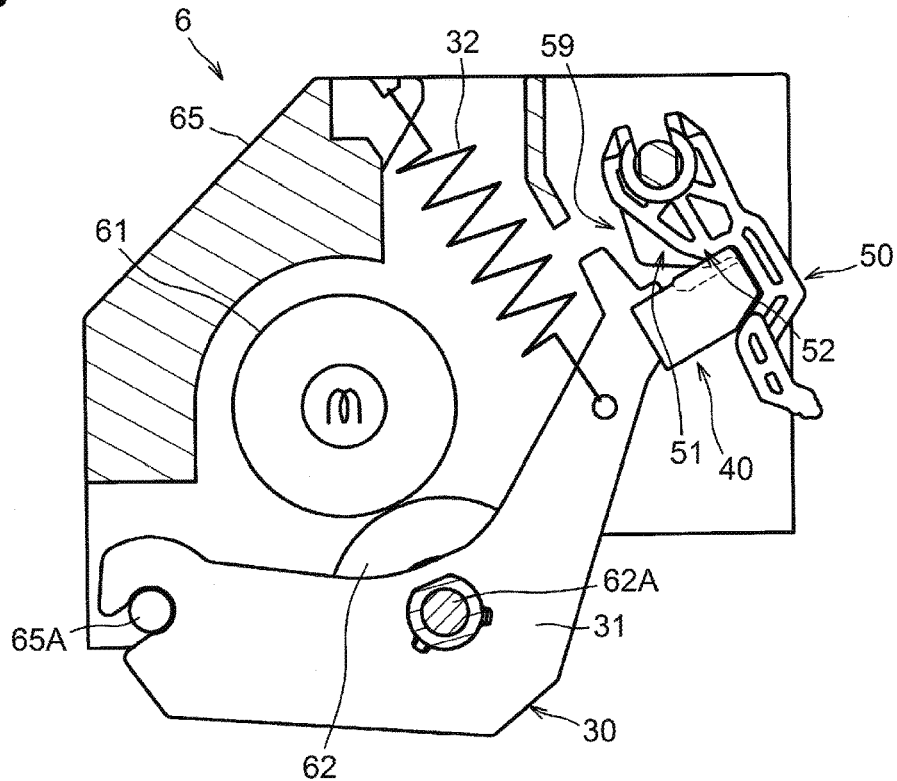
FIG. 9A is a side view of a nip pressure adjusting mechanism, according to one or more aspects of the disclosure, when the biasing member is at a third position

The biasing member 30, i.e. the support arm and the cover 40, may take several positions, such as, a first position as depicted in FIG. 2A, a second position, as depicted in FIG. 6A, an intermediate position, as depicted in FIG. 7A, and a third position, as depicted in FIG. 9A, as a user operates the operating lever 50. In other words, the biasing member 30 is configured to pivotally move from the first position to the third position via the second position and the intermediate position, or vice versa as a user operates the operating lever 50. More specifically, the biasing member 30 is configured to pivot from the first position to the second position first, and then from the second position to the third position via the intermediate position, as a user operates the operating lever 50 in the first pivot direction.

Figure 2B:
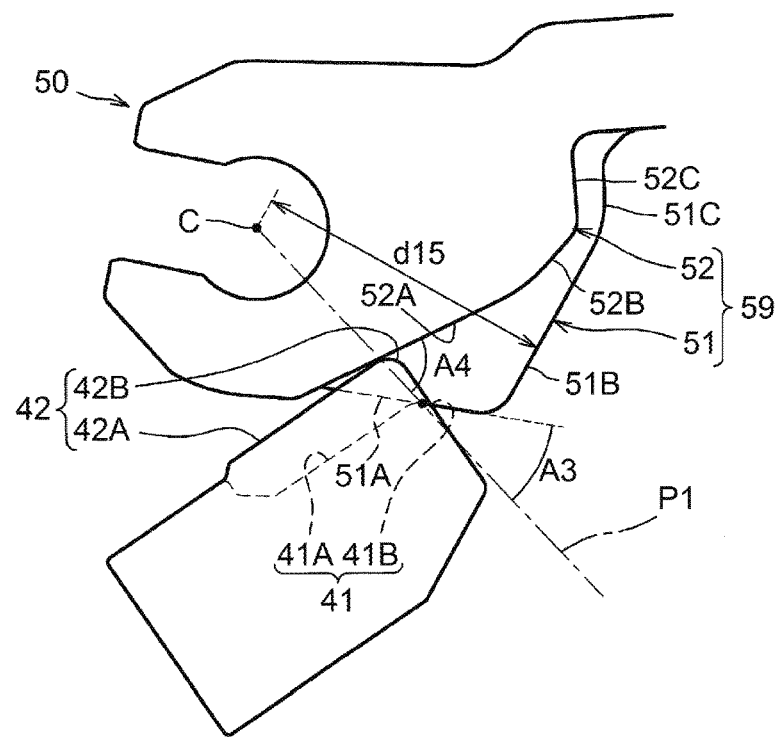
FIG. 2B is a partially enlarged view of FIG. 2A.

When the biasing member 30 is at the first position, as depicted in FIG. 2A, the first downstream surface 51A of the first cam portion 51 is in contact with the first convex surface 41B of the first receiving surface 41 of the cover 40, while the second cam portion 52 may or may not contact the second receiving surfaces 42 of the cover 40, as depicted in FIG. 2B. The support arm 31 is biased counterclockwise in FIG. 2A by the spring 32 such that the restricting member 31D of the support arm 31 is in contact with the stopper 65D of the frame 65. When the biasing member 30 is at a position other than the first position, the restricting member 31D is separated from the stopper 65D.

This configuration may hold the support arm 31 at the first position so that a nip width between the heat roller 61 and the pressure roller 62 may be stable. In detail, a distance between the axes of the heat roller 61 and the pressure roller 62 is minimum and a width of the nip between the heat roller 61 and the pressure roller 62 is maximum. This configuration provides a predetermined pressure at the nip and is suitable for fixing an image on ordinary media (e.g. plain paper).

As depicted in FIG. 2B, when the biasing member 30 is at the first position, an angle A3 formed between the flat surface 511 of the first downstream surface 51A of the first cam portion 51 and an imaginary plane P1 is smaller than an angle A4 formed between the second downstream surface 52A of the second cam portion 52 and the imaginary plane P1. The imaginary plane P1 passes through the pivot axis C and a contact point between the first downstream surface 51A and the first receiving surface 41, and is parallel to the axial direction when the biasing member 30 is at the first position. In other words, when the biasing member 30 is at the first position, the angle A3 is smaller than the angle A4 (A3<A4). In this configuration, when the biasing member 30, which is at a position between the first position and the second position, is pivoted, the first downstream surface 51A of the first cam portion 51 contacts the first receiving surface 41 of the cover 40 but the second downstream surface 52A of the second cam portion 52 does not contact the second receiving surface 42 of the cover 40.

Figure 5A:
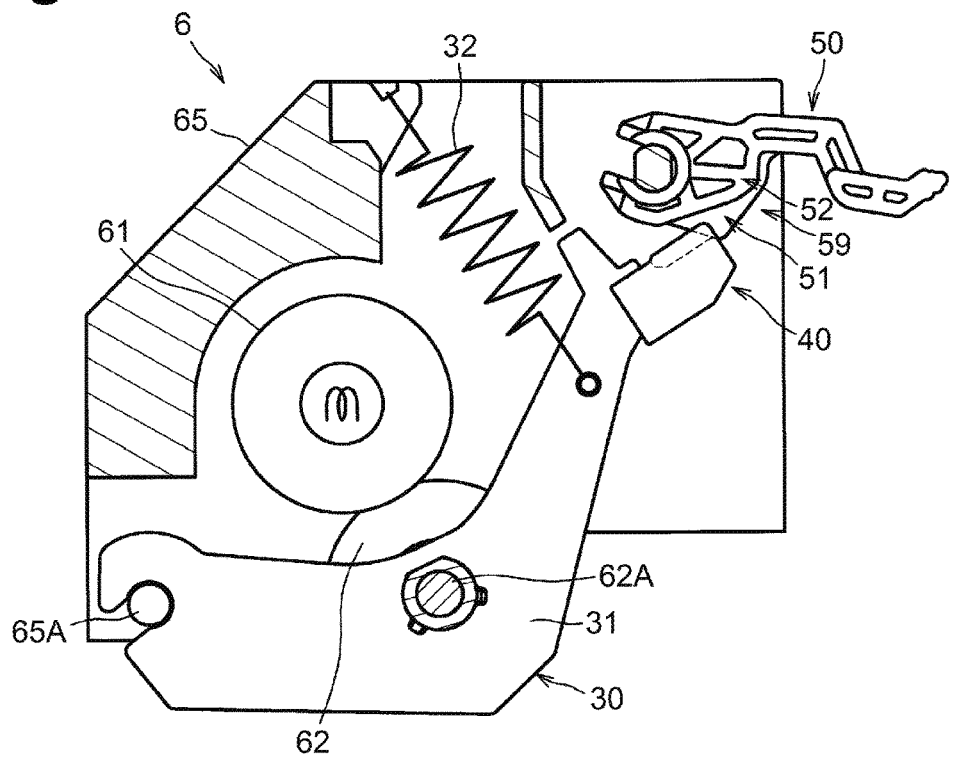
FIG. 5A is a side view of a nip pressure adjusting mechanism according to one or more aspects of the disclosure, illustrating a first upstream surface of the cam contacting a first bearing surface of the receiving member.
Figure 5B:
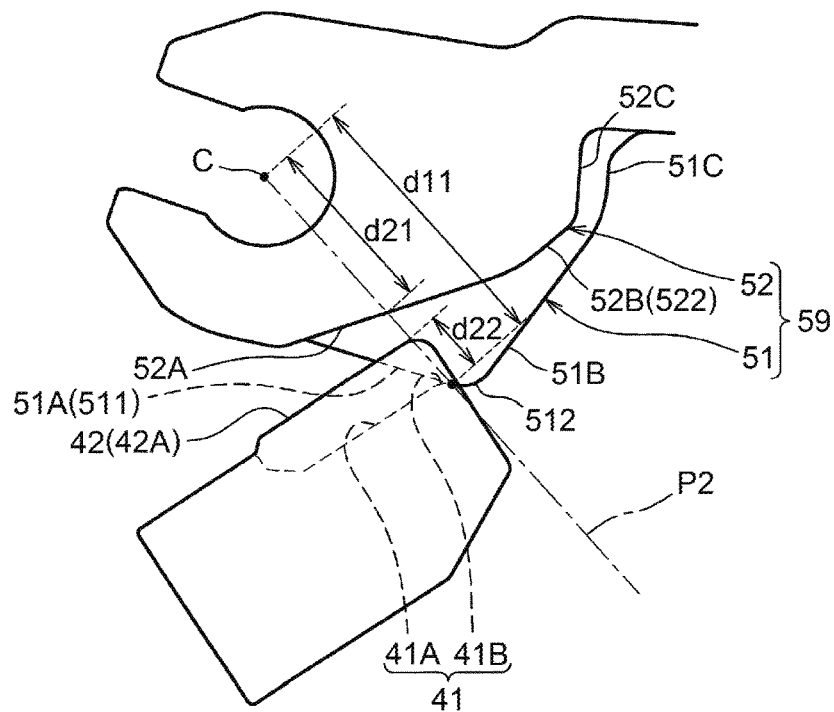
FIG. 5B is a partially enlarged view of the nip pressure adjusting mechanism of FIG. 5A.

Clockwise pivoting of the operating lever 50 (e.g., the cam 59) in FIG. 2A from a position corresponding the first position of the biasing member 30 may reduce a nip width. The pivoting of the operating lever 50 causes the first downstream surface 51A of the first cam portion 51 to contact the first convex surface 41B of the first receiving surface 41, as depicted in FIGS. 5A and 5B, thereby pivoting the biasing member 30. The flat surface 511 of the first downstream surface 51A has a relatively great inclination angle. Accordingly, the pivoting of the operating lever 50 by a small angle may cause the biasing member 30 to pivot relatively greatly.

As depicted in FIG. 5B, the imaginary plane P2 is defined that passes through the pivot axis C and a contact point between the curved surface 512 of the first downstream surface 51A and the first receiving surface 41, and is parallel to the axial direction when the biasing member 30 is at a position between the first position and the second position. When the first downstream surface 51A of the first cam 51 is in contact with the first receiving surface 41 of the cover 40, distance d11 is measured in the imaginary plane P2 from the pivot axis C to the first downstream surface 51A (e.g., from the pivot axis C to the contact point between the first downstream surface 51A and the first receiving surface 41); distance d21 is measured in the imaginary plane P2 from the pivot axis C to the second downstream surface 52A of the second cam 52; and distance d22 is measured in the imaginary plane P2 from the second receiving surface 42 of the cover 40 to the first downstream surface 51A of the first cam 51 (e.g., from the second flat surface 42A to the contact point between the first downstream surface 51A and the first receiving surface 41), in which the expression "d11>d21+d22" is satisfied. In other words, when the first downstream surface 51A is in contact with the first receiving surface 41, the second downstream surface 52A does not contact the second receiving surface 42 or is spaced from the second receiving surface 42.

Figure 6B:
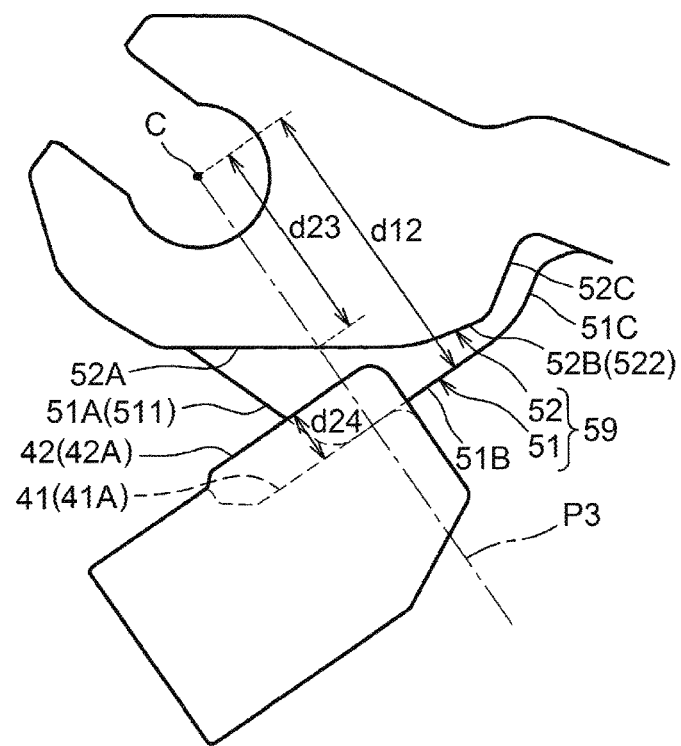
FIG. 6B is a partially enlarged view of the nip pressure adjusting mechanism of FIG. 6A.

Further clockwise pivoting of the operating lever 50 causes the first receiving surface 41 of the cover 40 to slidably move past the curved surface 512 of the first downstream surface 51A of the first cam portion 51. The first flat surface 41A makes face-to-face contact with the first intermediate surface 51B as depicted in FIGS. 6A and 6B, reaching a position corresponding to the second position of the biasing member 30. While the biasing member 30 moves from the first position to the second position, the second cam portion 52 is distanced from the second receiving surfaces 42. The first intermediate surface 51B includes a portion having inclination angles including zero (0), which may keep the biasing member 30 at the second position.

When the biasing member 30 is at the second position, the distance between the axes of the heat roller 61 and the pressure roller 62 becomes longer than the distance between axes of the rollers 61 and 62 when the biasing member 30 is at the first position, and a nip width becomes smaller than that when the biasing member 30 is at the first position. This configuration provides less pressure at the nip than that when the biasing member 30 is at the first position, and may be suitable for fixing an image on relatively thick media (e.g., cardboard)

When the biasing member 30 is at the second position, as depicted in FIG. 6A, the first intermediate surface 51B of the first cam portion 51 is in contact with the first flat surface 41A of the first receiving surface 41 of the cover 40 and the second cam portion 52 is slightly distanced from the second receiving surfaces 42 of the cover 40, as depicted in FIG. 6B. In other words, the first intermediate surface 51B keeps the biasing member 30 at the second position by making face-to-face contact with the first flat surface 41A of the first receiving surface 41.

As depicted in FIG. 6B, an imaginary plane P3 is defined that is perpendicular to the first intermediate surface 51B when the first intermediate surface 51B of the first cam 51 is in contact with the first receiving surface 41 of the cover 40. When the first intermediate surface 51B is in contact with the first receiving surface 41, distance d12 is measured in the imaginary plane P3 from the pivot axis C to the first intermediate surface 51B; distance d23 is measured in the imaginary plane P3 from the pivot axis C to the second downstream surface 52A of the second cam 52; and distance d24 is measured in the imaginary plane P3 from the second receiving surface 42 of the cover 40 to the first intermediate surface 51B of the first cam 51, in which the expression "d12>d23+d24" is satisfied. In other words, when the first intermediate surface 51B is in contact with the first receiving surface 41, the second downstream surface 52A is spaced from the second receiving surface 42.

Figure 7B:
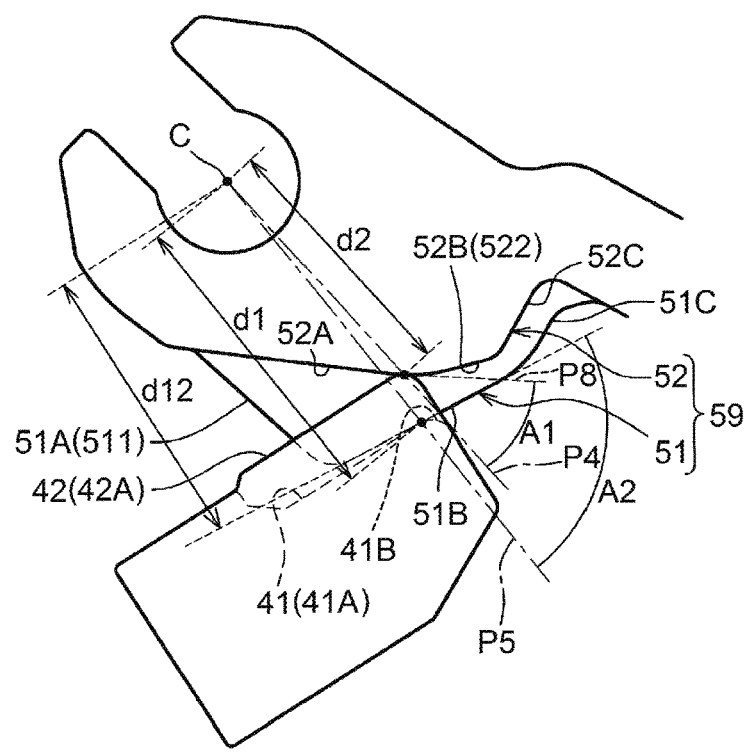
FIG. 7B is a partially enlarged view of the nip pressure adjusting mechanism of FIG. 7A

Further clockwise pivoting of the operating lever 50 from a position corresponding to the second position toward the intermediate position of the biasing member 30 causes the first intermediate surface 51B of the first cam 51 to slide on the first convex surface 41B of the first receiving surface 41, thereby pivoting the biasing member 30 to the intermediate position, as depicted in FIGS. 7A and 7B. When the biasing member 30 is at the intermediate position, as depicted in FIG. 7A, the first cam portion 51 (e.g., the first intermediate surface 51B) is contact with the first receiving surface 41 (e.g., the first convex surface 41B) of the cover 40 and the second cam portion 52 (e.g., the first curved surface 521 of the second intermediate surface 52B) is in contact with the second receiving surfaces 42 (e.g., the second convex surface 42B) of the cover 40, as depicted in FIG. 7B.

When the biasing member 30 is at the intermediate position, the inclination angle $\alpha 2$ of the first intermediate surface 51B at the contact point between the first cam portion 51 and the first receiving surface 41 is smaller than the inclination angle $\alpha 1$ of the second intermediate surface 52B at the contact point between the second cam portion 52 and the second receiving surface 42. Accordingly, further clockwise pivoting of the operating lever 50 may cause the second cam portion 52 to move in sliding contact with the second receiving surface 42, but cause the first cam portion 51 to move out of contact with the first receiving surface 41.

As depicted in FIG. 7B, when the biasing member 30 is at the intermediate position, distance d2 from the pivot axis C to a contact point between the second cam portion 52 and the second receiving surface 42 is smaller than distance d1 from the pivot axis C to a contact point between the first cam portion 51 and the first receiving surface 41 (d2<d1). The distance d2 is also smaller than distance d12 from the pivot axis C to the first intermediate surface 51B of the first cam portion 51 (d12>d2). In other words, the cam 59 and the cover 40 are formed and arranged such that the distance from the pivot axis C of the cam 59 to a contact point between the cam 59 and the cover 40 is reduced when a portion of the cam 59 pivoting the biasing member 30 is changed from the first cam portion 51 to the second cam portion 52.

When the biasing member 30 is at the intermediate position, an angle A1 formed between an imaginary plane P4 and an imaginary plane P8 is smaller than an angle A2 formed between an imaginary plane P5 and the first intermediate surface 51B. The imaginary plane P4 passes through the pivot axis C and a contact point between the first curved surface 521 of the second cam portion 52 and the second convex surface 42B of the cover 40, and is parallel to the axial direction. The imaginary plane P5 passes through the pivot axis C and a contact point between the first intermediate surface 51B of the first cam portion 51 and the first convex surface 41B of the cover 40, and is parallel the axial direction. The imaginary plane P8 is a tangent plane to the first curved surface 521 of the second cam portion 52 at a contact point between the first curved surface 521 and the second convex surface 42B of the cover 40, and is parallel to the axial direction. In other words, an inclination angle $\alpha 1$ of the second intermediate surface 52B (90°−A1) in the imaginary plane P4 is greater than an inclination angle $\alpha 2$ of the first intermediate surface 51B (90°−A2) in the imaginary plane P5.

Accordingly, when the biasing member 30 is at a position between the first position and the intermediate position, the first downstream surface 51A of the first cam portion 51 is in contact with the first receiving surface 41 of the cover 40, but the second cam portion 52 does not contact the second receiving surface 42 of the cover 40. In contrast, when the biasing member 30 is at a position between the intermediate position and the third position, the first cam portion 51 does not contact the first receiving surface 41 of the cover 40, but the second intermediate surface 52B of the second cam portion 52 is in contact with the second receiving surface 42 of the cover 40.

Figure 8A:
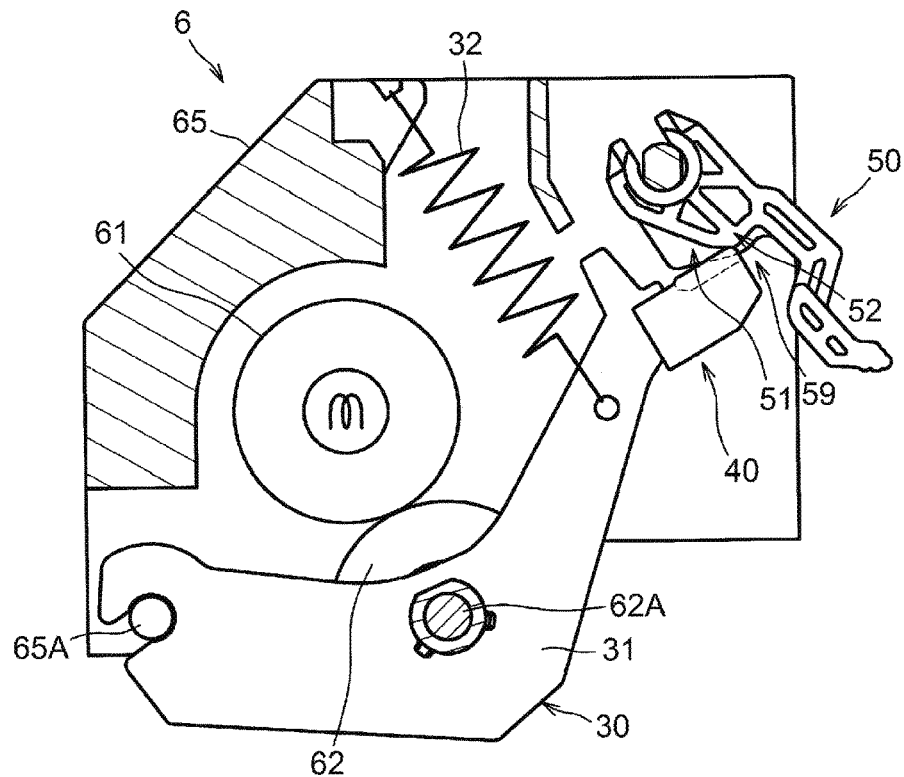
FIG. 8A is a side view of a nip pressure adjusting mechanism, according to one or more aspects of the disclosure, illustrating a second intermediate surface of the cam contacts a second bearing surface of the receiving member.
Figure 8B:
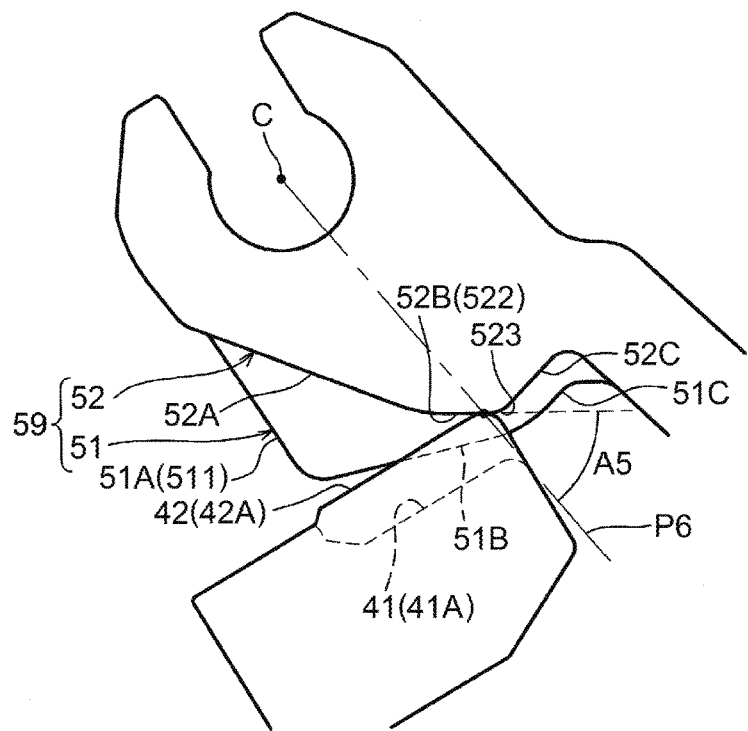
FIG. 8B is a partially enlarged view of the nip pressure adjusting mechanism of FIG. 8A.

Further clockwise pivoting of the operating lever 50 from a position corresponding to the intermediate position toward the third position of the biasing member 30 causes the second intermediate surface 52B of the second cam portion 52 to move in contact with the second receiving surface 42, thereby pivoting the biasing member 30, as depicted in FIGS. 8A and 8B. The inclination angle $\alpha 5$ of the flat surface 522 of the second intermediate surface 52B is smaller than the inclination angle $\alpha 3$ of the flat surface 511 of the first downstream surface 51A. This configuration may require less torque to pivot the biasing member 30 from the intermediate position to the third position, as compared with a configuration in which the inclination angle $\alpha 5$ is greater than or equal to the inclination angle $\alpha 3$.

As depicted in FIG. 8B, an angle A5 is formed between an imaginary plane P6 and the flat surface 522 of the second intermediate surface 52B of the second cam portion 52. The imaginary plane P6 passes through the pivot axis C and a contact point between the second intermediate surface 52B and the second receiving surface 42, and is parallel to the axial direction when the biasing member 30 is at a position between the intermediate position and the third position. The cam 59 is formed and arranged such that the angle A5 is greater than the angle A3 (A5>A3). In other words, an inclination angle $\alpha 5$ (90°−A5) of the second intermediate surface 52B of the second cam 52 in the imaginary plane P6 is smaller than an inclination angle $\alpha 3$ (90−A3) of the first downstream surface 51A of the first cam 51 in the imaginary plane P1.

In a configuration in which the inclination angle α5 is greater than or equal to the inclination angle α3, more torque is required to pivot the biasing member 30 from the intermediate position to the third position than to pivot the biasing member 30 from the first position to the intermediate position, because the second intermediate surface 52B has a radius greater than the first downstream surface 51A. In contrast, in the illustrative embodiment, the inclination angle α5 of the second intermediate surface 52B is smaller than the inclination angle α3 of the first downstream surface 51A. This configuration may reduce torque required to pivot the biasing member 30 from the intermediate position to the third position, as compared with a configuration in which the inclination angle α5 is greater than or equal to the inclination angle α3.

Figure 9B:
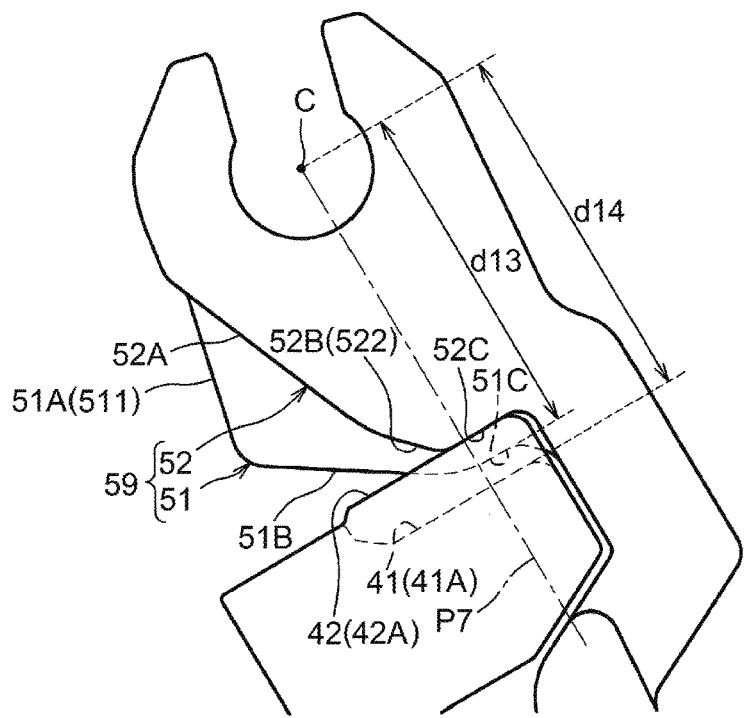
FIG. 9B is a partially enlarged view of the nip pressure adjusting mechanism of FIG. 9A.

Further clockwise pivoting of the operating lever 50 toward the third position of the biasing member 30 causes the second receiving surface 42 of the cover 40 to slidably move past the second curved surface 523 of the second cam 52. The second flat surface 42A of the second receiving surface 42 makes face-to-face contact with the second upstream surface 52C of the second cam 52, as depicted in FIGS. 9A and 9B, reaching a position corresponding to the third position of the biasing member 30. The second upstream surface 52C has inclination angles including zero (0), which may keep the biasing member 30 at the third position. When the biasing member 30 is at the third position, the distance d14 is greater than the distance d13 (d14>d13), so that the first upstream surface 51C of the first cam portion 51 may not contact the first flat surface 41A of the first receiving surface 41.

As the biasing member 30 reaches the third position, the pressure roller 62 is separated or moved away from the heat roller 61, to reduce the pressure at the nip. The distance between the axes of the rollers 61 and 62 is maximum. This configuration may be suitable for clearing a jammed sheet.

When the biasing member 30 is at the third position, as depicted in FIG. 9A, the first cam portion 51 (e.g., the first upstream surface 51C) does not contact the first receiving surface 41 but the second cam portion 52 (e.g., the second upstream surface 52C) is in contact with the second receiving surfaces 42, as depicted in FIG. 9B.

In other words, the second intermediate surface 52B contacts the biasing member 30 between the intermediate position and the third position. The second upstream surface 52C is configured to keep the biasing member 30 at the third position, by making face-to-face contact with the second flat surfaces 42A of the second receiving surfaces 42 of the cover 40.

As depicted in FIG. 9B, an imaginary plane P7 is defined that is perpendicular to the second upstream surface 52C of the second cam 52 when the second upstream surface 52C is in contact with the second receiving surface 42. When the second upstream surface 52C is in contact with the second receiving surface 42, distance d13 is measured in the imaginary plane P7 from the pivot axis C to a peripheral surface of the first cam portion 51 (e.g., the first upstream surface 51C), and distance d14 is measured in the imaginary plane P7 from the pivot axis C to the first receiving surface 41 of the cover 40, in which the distance d14 is greater than the distance d13 (d14>d13). In other words, when the second upstream surface 52C is in contact with the second receiving surface 42, the first cam portion 51 is spaced from the first receiving surface 41.

During the pivoting of the operating lever 50, the second receiving surfaces 42 are located on both sides of the first cam portion 51 to sandwich the first cam portion 51 between the second receiving surfaces 42. Each of the side surfaces 43, which connects the first receiving surface 41 and a respective one of the second receiving surfaces 42, may restrict the movement of the first cam portion 51 in the pivot axis direction. This may stabilize the position of the cam 59 in the axial direction, leading to engagement between the cam 59 and the cover 40.

The first cam portion 51 contacts the biasing member 30 while the biasing member 30 moves from the first position to the intermediate position. When the biasing member 30 arrives at the intermediate position, the first cam portion 51 gets away from the biasing member 30. Then the first cam portion 51 is distanced from the biasing member 30 while the biasing member moves from the intermediate position to the third position.

The second cam portion 52 is distanced from the biasing member 30 while the biasing member moves from the first position to the intermediate position. When the biasing member 30 arrives at the intermediate position, the second cam portion 52 gets contacted with the biasing member 30. Then, the second cam portion 52 contacts the biasing member 30 while the biasing member 30 moves from the intermediate position to the third position.

A width of the nip (or a nip width) between the heat roller 61 and the pressure roller 62 refers to a length, in a rotating direction of the heat roller 61, of a nip region where a sheet S is held between an outer peripheral surface of the heat roller 61 and an outer peripheral surface of the pressure roller 62.

As the biasing member 30 is moved further from the first position toward the third position, the distance between the axes of the heat roller 61 and the pressure roller 62 becomes longer, and a nip width becomes smaller. This configuration may provide less pressure at the nip.

To move the biasing member 30 from the third position to the first position, the operating lever 50 may be pivoted reversely in a counterclockwise direction. More specifically, counterclockwise pivoting of the operating lever 50 from a position corresponding to the third position of the biasing member 30 causes the second upstream surface 52C of the second cam 52, which is in contact with the second receiving surface 42 of the cover 40, as depicted in FIGS. 9A and 9B, to move out of contact with the second receiving surface 42 as depicted in FIGS. 8A and 8B, and the second intermediate surface 52B of the second cam 52 to slidably move in contact with the second receiving surface 42. As the operating lever 50 pivots further in the counterclockwise direction in FIG. 8A, the cover 40 moves closer to the pivot axis C gradually, because the support arm 31 is biased counterclockwise by the spring 32.

After the biasing member 30 reaches the intermediate position, as depicted in FIGS. 7A and 7B, the second cam portion 52 moves away from the second receiving surface 42, and the first cam portion 51 moves in contact with the first receiving surface 41. The biasing member 30 pivotally moves to the second position, as depicted in FIG. 6A, by the first intermediate surface 51B of the first cam 51 face-to-face contact with the first flat surface 41A of the first receiving surface 41 of the cover 40.

Further counterclockwise pivoting of the operating lever 50 from the second position causes the first downstream surface 51A of the first cam 51 to slidably move on the first convex surface 41B of the first receiving surface 41, as depicted in FIG. 5B. The pivoting of the operating lever 50 causes the biasing member 30 to return to the first position, as depicted in FIG. 2A, in which the restricting member 31D of the support arm 31 contacts the stopper 65D of the frame 65. The support arm 31 is thus fixed in position.

As described above, the fixing device 6 of the laser printer 1 according to the illustrative embodiment includes the biasing member 30 configured to pivot from the first position to the intermediate position, by making the first cam portion 51 contact with the first receiving surface 41. The biasing member 30 is also configured to pivot from the intermediate position to the third position, by making the second cam portion 52 contact with the second receiving surfaces 42. When the biasing member 30 is at the intermediate position, the distance d2 from the pivot axis C to the contact point between the second cam portion 52 and the second receiving surface 42 is smaller than the distance d1 from the pivot axis C to the contact point between the first cam portion 51 and the first receiving surface 41. This configuration may allow the biasing member 30 to move from the second position to the third position, without increasing the radius of the cam 59, leading to reduction of the size of the operating lever 50. In other words, without increasing the radius of the cam 59, pressures at the nip between the heat roller 61 and the pressure roller 62 may be varied in multiple steps. The smaller distance d2 may reduce torque required to pivot the cam 59.

While the disclosure is described in detail with reference to specific embodiments thereof, this is merely an example, and various changes, arrangements and modifications may be applied therein without departing from the spirit and scope of the disclosure.

Figure 10:
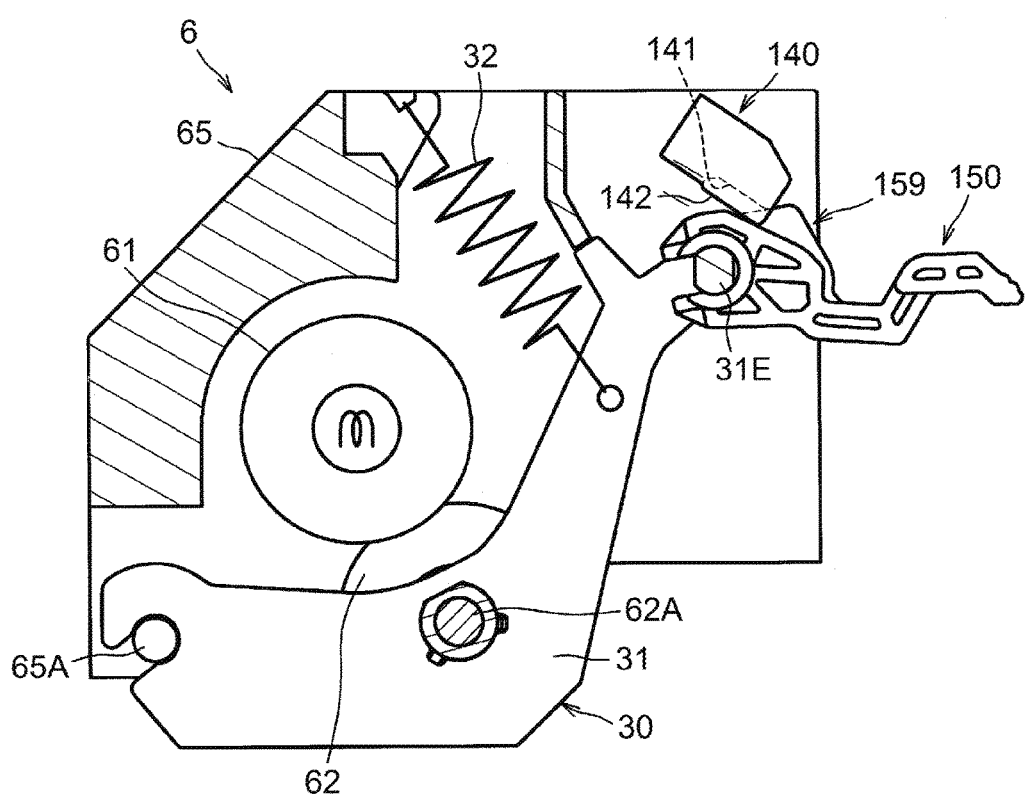
FIG. 10 is a side view of a fixing device in a first modification according to one or more aspects of the disclosure.

For example, as depicted in FIG. 10, an operating lever 150 including a cam 159 may be pivotally supported by a shaft 31E of the biasing member 30. A receiving member 140 including a first receiving surface 141 and a second receiving surface 142 may be fixed to the frame 65.

Figure 11A:
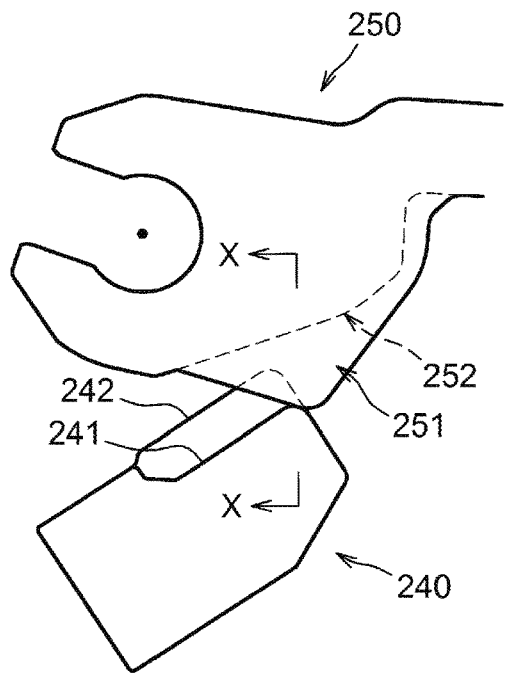
FIG. 11A is a side view of a cam and a receiving member of a fixing device in a second modification according to one or more aspects of the disclosure, illustrating a first upstream surface of the cam contacting a first bearing surface of the receiving member.
Figure 11B:
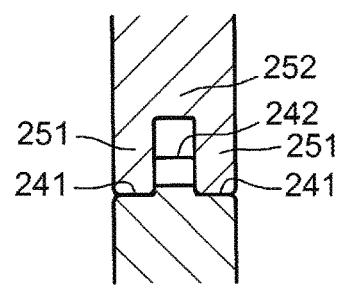
FIG. 11B is a cross-sectional view of FIG. 11A taken along the line X-X.
Figure 12A:
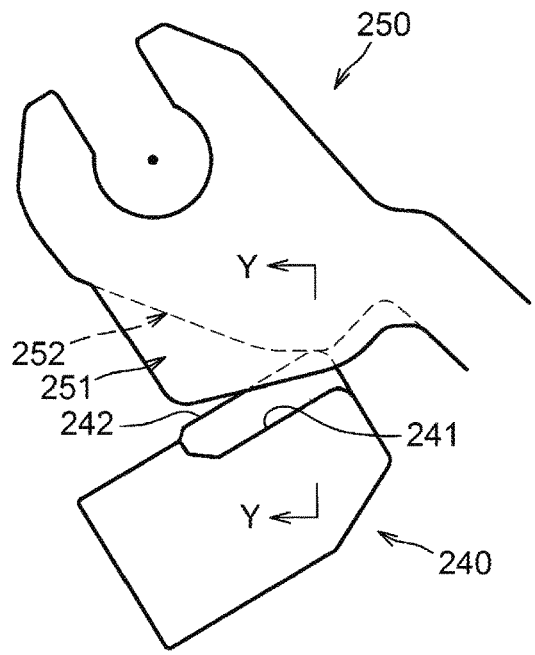
FIG. 12A is a side view of the cam and the receiving member of the fixing device in the second modification according to one or more aspects of the disclosure, illustrating a second intermediate surface of the cam contacting a second bearing surface of the receiving member.
Figure 12B:
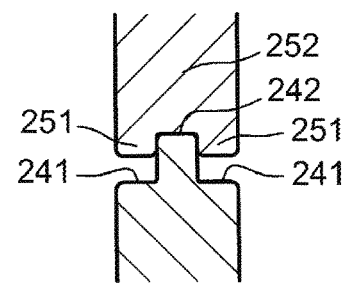
FIG. 12B is a cross-sectional view of FIG. 12A taken along the line Y-Y.

As depicted in FIGS. 11A and 11B, a cam 250 may include first cam portions 251 and a second cam portion 252. The first cam portions 251 may be located on both sides of the second cam portion 252 in the axial direction and adjacent to the second cam portion 252. A cover 240 may include first receiving surfaces 241 and a second receiving surface 242. The first receiving surfaces 241 may be located on both sides of the second receiving surface 242 in the axial direction and adjacent to the second receiving surface 242. When the first cam portions 251 are in contact with the first receiving surfaces 241, the second receiving surface 242 may be located between the two first cam portions 251 without contacting the second cam portion 252. As depicted in FIGS. 12A and 12B, when the second cam portion 252 is in contact with the second receiving surface 242, the second receiving surface 242 may be located between the two first cam portions 251 without contacting the first receiving surfaces 241.

In another embodiment, the heat roller 61 may be biased toward the pressure roller 62, unlike the illustrative embodiment in which the pressure roller 62 is biased toward the heat roller 61.

In another embodiment, when the first cam portion 51 keeps the biasing member 30 at the first position or the second position, the second downstream surface 52A of the second cam portion 52 or any other portion of the cam 59 may be contact to the cover 40. In a similar manner, when the second cam portion 52 keeps the biasing member 30 at the third position, the first upstream surface 51C of the first cam portion 51 or any other portion of the cam 59 may be contact to the cover 40.

The image forming apparatus according to the illustrative embodiment may not necessarily be a monochrome laser printer. For example, the image forming apparatus may be a color image forming apparatus, a LED printer, a copier, or a multi-functional device. The sheets may be, for example, transparent or OHP sheets, or other types of sheets. Further, a heat member is not limited to a heat roller, but may be, for example, a heat belt.

This application comprises possible combinations of the various elements and features disclosed herein, and the particular elements and features presented in the claims and disclosed above may be combined with each other in other ways within the scope of the application.

What is claimed is:

1. A fixing device comprising:
    a frame including a joint;
    a first rotary body extending in an axial direction, the first rotary body being supported at the frame;
    a second rotary body extending in the axial direction;
    a spring including one end connected to the frame and another end;
    a support arm connected to the joint, the second rotary body, and the other end of the spring;
    a cam pivotably connected to one of the frame and the support arm, the cam being pivotable about a pivot axis extending parallel to the axial direction, the cam including a first cam portion, and a second cam portion located at a different point from the first cam portion in the axial direction and having a radial distance from the pivot axis smaller than a radial distance of the first cam portion from the pivot axis; and
    a receiving member disposed on the other of the frame and the support arm that is not pivotably connected to the cam, the receiving member including a first receiving surface and a second receiving surface, the second receiving surface having a different surface height than the first receiving surface in a radial direction from the pivot axis,
    wherein:
        when the first cam portion is in contact with the first receiving surface, the second cam portion is out of contact with the second receiving surface, and
        when the first cam portion is out of contact with the first receiving surface, the second cam portion is in contact with the second receiving surface.

2. The fixing device according to claim 1,
    wherein the first cam portion has a first upstream surface, a first downstream surface, and a first intermediate surface between the first upstream surface and the first downstream surface in a first rotational direction about the pivot axis,
    wherein the second cam portion has a second upstream surface, a second downstream surface, and a second intermediate surface between the second upstream surface and the second downstream surface in the first rotational direction, and
    wherein an outer peripheral surface of the first rotary body and an outer peripheral surface of the second rotary body defines a nip width, the nip width being:
        a first value when the first downstream surface is in contact with the first receiving surface and the second downstream surface faces the second receiving surface without contacting the receiving member;
        a second value when the first intermediate surface is in contact with the first receiving surface and the second intermediate surface is in contact with the second receiving surface; and
        a third value when the first upstream surface faces the first receiving surface without contacting the receiving member and the second upstream surface is in contact with the second receiving surface, and wherein the third value is less than the second value and the second value is less than the first value.

3. The fixing device according to claim 2, wherein, when the first intermediate surface is in contact with the first receiving surface and the second intermediate surface is in contact with the second receiving surface, a second distance from the pivot axis to a contact point where the second cam portion contacts the second receiving surface is less than a first distance from the pivot axis to a contact point where the first cam portion contacts the first receiving surface.

4. The fixing device according to claim 3,
wherein the first intermediate surface includes a first flat surface,
wherein, when the first intermediate surface is in contact with the first receiving surface and the second intermediate surface is in contact with the second receiving surface, a first angle formed between a first imaginary plane and a second imaginary plane is less than a second angle formed between a third imaginary plane and the first flat surface, and
wherein:
the first imaginary plane encompasses the pivot axis and a contact point between the second intermediate surface and the second receiving surface;
the third imaginary plane encompasses the pivot axis and a contact point between the first intermediate surface and the first receiving surface; and
the second imaginary plane is a tangent plane to the second intermediate surface at a contact point between the second intermediate surface and the second receiving surface.

5. The fixing device according to claim 2,
wherein the first downstream surface is a flat surface,
wherein the second downstream surface is a flat surface,
wherein, when the first cam portion is in contact with the first receiving surface and the second cam portion is out of contact with the second receiving surface, a first angle formed between the first downstream surface and a first imaginary plane is less than a second angle formed between the second downstream surface and the first imaginary plane, and
wherein the first imaginary plane encompasses the pivot axis and a contact point between the first downstream surface and the first receiving surface.

6. The fixing device according to claim 5,
wherein the second intermediate surface includes a flat surface,
wherein, when the flat surface of the second intermediate surface is in contact with the second receiving surface, a third angle is defined between the flat surface of the second intermediate surface and a second imaginary plane, the second imaginary plane encompassing the pivot axis and the contact point between the flat surface of the second intermediate surface and the second receiving surface, and
wherein the third angle is greater than the first angle.

7. The fixing device according to claim 1,
wherein, when the first cam portion is in contact with the first receiving surface, a first distance is greater than a sum of a second distance and a third distance,
wherein the first distance is measured, in an imaginary plane, from the pivot axis to a contact point where the first cam portion contacts the first receiving surface, the imaginary plane encompassing the pivot axis and the contact point where the first cam portion contacts the first receiving surface,
wherein the second distance is measured, in the imaginary plane, from the pivot axis to the second cam portion, and
wherein the third distance is measured, in the imaginary plane, from the second receiving surface to the first cam portion.

8. The fixing device according to claim 1,
wherein, when the second cam portion is in contact with the second receiving surface, a first distance is greater than a second distance,
wherein the first distance is a distance, in an imaginary plane, between the pivot axis and the first receiving surface, the imaginary plane encompassing the pivot axis and a contact point where the second cam portion contacts the second receiving surface, and
wherein the second distance is a distance, in the imaginary plane, between the pivot axis and the first cam portion.

9. The fixing device according to claim 1, wherein the first cam portion is positioned at a middle of the cam in the axial direction, and the second cam portion is positioned at both sides of the first cam portion in the axial direction.

10. The fixing device according to claim 9,
wherein the receiving member includes two of the second receiving surfaces,
wherein the first receiving surface is positioned at a middle of the receiving member in the axial direction, one of the second receiving surfaces is positioned at one side of the first receiving surface in the axial direction, the other of the second receiving surfaces is positioned at the other side of the first receiving surface in the axial direction, and both of the second receiving surfaces are connected to the first receiving surface by a respective one of two side surfaces, and
wherein the first cam portion is sandwiched between the two side surfaces.

11. The fixing device according to claim 1, wherein the first rotary body comprises a heat member, and the second rotary body comprises a pressure member.

12. The fixing device according to claim 11, wherein the heat member comprises a heat roller and the pressure member comprises a pressure roller.

13. An apparatus comprising:
a cam including a first cam portion rotatable about a pivot axis and a second cam portion rotatable about the pivot axis, wherein a radial distance from the first cam portion to the pivot axis is greater than a radial distance from the second cam portion to the pivot axis;
a receiving member including a first receiving surface positioned to contact a peripheral surface of the first cam portion and a second receiving surface positioned to contact a peripheral surface of the second cam portion, the second receiving surface having a different surface height than the first receiving surface in a radial direction from the pivot axis; and
a spring configured to place the cam and the receiving member in at least one of a first contact state in which the peripheral surface of the first cam portion is in contact with the first receiving surface; and a second contact state in which the peripheral surface of the second cam portion is in contact with the second receiving surface.

14. The apparatus of claim 13, wherein, in the first contact state, a difference between a first distance and a second distance is greater than a third distance, the first distance being a distance from the pivot axis to the first cam portion in an imaginary plane, the imaginary plane encompassing the pivot axis and a contact point where the peripheral surface of the first cam portion contacts the first receiving surface, the second distance being a distance from the pivot axis to the second cam portion in the imaginary plane, and the third distance being a distance, in the imaginary plane, between the first receiving surface and the second receiving surface.

15. The apparatus of claim 13, wherein, in the second contact state, a difference between a second distance and a first distance is less than a third distance, the first distance being a distance from the pivot axis to the first cam portion in an imaginary plane encompassing the pivot axis and a contact point where the peripheral surface of the second cam portion contacts the second receiving surface, the second distance being a distance from the pivot axis to the second cam portion in the imaginary plane, and the third distance being a distance, in the imaginary plane, between the first receiving surface and the second receiving surface.

16. The apparatus according to claim 13, wherein the first cam portion has a first upstream surface and a first downstream surface positioned downstream of the first upstream surface in a first rotational direction about the pivot axis, wherein the second cam portion has a second upstream surface and a second downstream surface positioned downstream from the second upstream surface in the first rotational direction, wherein, when in the first contact state, the first downstream surface is in contact with the first receiving surface and the second downstream surface faces the second receiving surface without contacting the receiving member, and wherein, when in the second contact state, the first upstream surface faces the first receiving surface without contacting the receiving member and the second upstream surface is in contact with the second receiving surface.

17. The apparatus according to claim 16, wherein the first downstream surface is a flat surface, wherein the second downstream surface is a flat surface, wherein, when the first cam portion is in contact with the first receiving surface and the second cam portion is out of contact with the second receiving surface, a first angle formed between the first downstream surface and a first imaginary plane is less than a second angle formed between the second downstream surface and the first imaginary plane, and wherein the first imaginary plane encompasses the pivot axis and a contact point between the first downstream surface and the first receiving surface.

18. The apparatus according to claim 17, wherein the second cam portion includes a second intermediate surface between the second downstream surface and the second upstream surface, the second intermediate surface including a flat surface, wherein, when the flat surface of the second intermediate surface is in contact with the second receiving surface, a third angle is defined between the flat surface of the second intermediate surface and a second imaginary plane, the second imaginary plane encompassing the pivot axis and the contact point between the flat surface of the second intermediate surface and the second receiving surface, and wherein the third angle is greater than the first angle.

19. The apparatus according to claim 13, wherein the first cam portion is positioned at a middle of the cam in a direction of the pivot axis, and the second cam portion is positioned at both sides of the first cam portion in the direction of the pivot axis.

20. The apparatus according to claim 19, wherein the receiving member includes two of the second receiving surfaces, wherein the first receiving surface is positioned at a middle of the receiving member in the direction of the pivot axis, one of the second receiving surfaces is positioned at one side of the first receiving surface in the direction of the pivot axis, the other of the second receiving surfaces is positioned at the other side of the first receiving surface in the direction of the pivot axis, and both of the second receiving surfaces are connected to the first receiving surface by a respective one of two side surfaces, and wherein the first cam portion is sandwiched between the two side surfaces.

* * * * *